April 22, 1958     F. C. LO GRASSO     2,831,597
SWITCH BOX EMBODYING INTEGRALLY-FORMED ANCHORING
MEANS FOR COOPERATING WALL-ENGAGING ELEMENTS
Filed June 9, 1954
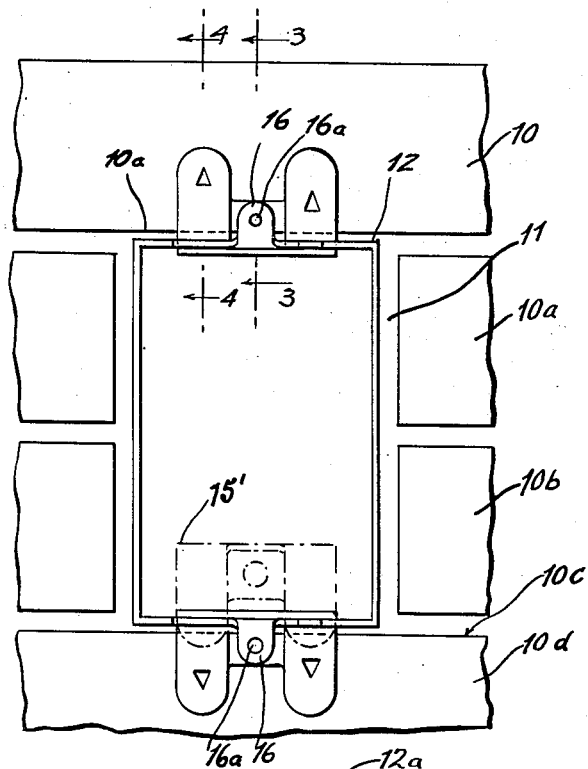
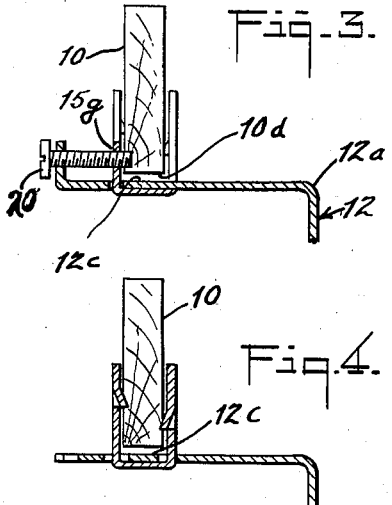
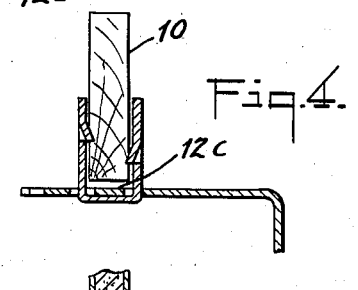
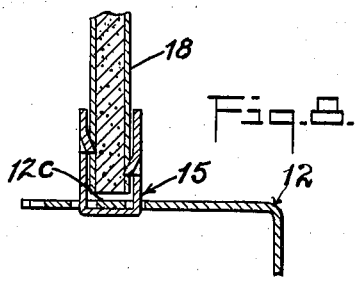
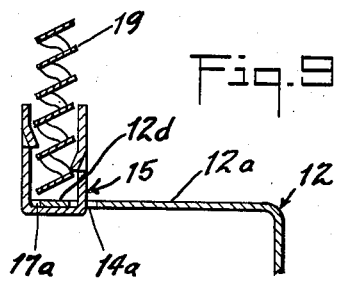
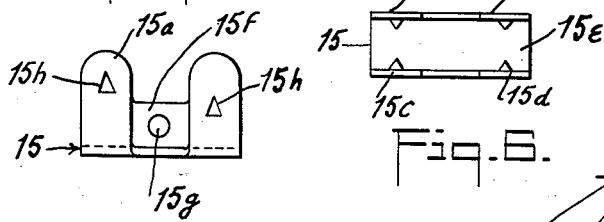
INVENTOR.
FRANK C. LoGRASSO
BY
Joseph F. O'Brien
Attorney

United States Patent Office 2,831,597
Patented Apr. 22, 1958

2,831,597

SWITCH BOX EMBODYING INTEGRALLY-FORMED ANCHORING MEANS FOR CO-OPERATING WALL-ENGAGING ELEMENTS

Frank C. Lo Grasso, Brooklyn, N. Y.

Application June 9, 1954, Serial No. 435,588

3 Claims. (Cl. 220—3.6)

This invention relates to a switch box embodying integrally-formed anchoring means for cooperating wall-engaging elements.

One of the objects of this invention is to provide a switch box with integrally-formed anchoring means adapted to cooperate with matching wall-engaging fastening elements for facilitating the mounting and supporting of a box on a wall and thus to make it possible for an electrician to immediately and quickly mount and anchor a switch box in position in a much lesser period of time than has heretofore been possible, and with this end in view to provide integrally in the box an anchoring rib or slat disposed between a pair of slots which permit the insertion and passage of flanges of the fastening elements into anchoring positions.

Another object of my invention is to provide on the inserted portion of the fastening elements means for automatically engaging the opposite surfaces of the wall upon insertion to produce an initial fastening or mounting of the box and thereafter to provide means for securely locking the box to the lath or other wall portion by a screw or screws extending through a secondary anchoring element and into said inserted portion at a right angle to the insertion movement thereof and thus to secondarily and positively lock the box in mounted position.

Particularly my invention relates to a box having its upper and lower walls each provided with pairs, and preferably a group of integrally formed slots, a pair of which slots define an integral rib or slat which anchors and cooperates with a channel-shaped slot-spanning wall-engaging fastening element having a web portion spanning a pair of said slots in the box wall and contacting such rib or slat inside the box, said fastening element being provided with spaced parallel flanges extensible through said opposed slots to project outwardly above the rib or slat of the wall of the box and at right angles thereto so as to produce a lath-receiving channel above the slat portion of the wall of the box, and thus to engage opposite sides of a wall and when conjointly used at the top and bottom of the box positively and securely anchoring the box in position on the wall.

Another object of this invention is in a wall-engaging fastening element of the character specified to provide in the wall of the switch box a group of slots which will provide a plurality of anchoring ribs and enable cooperation of said channel-shaped element with a pair of slots in said group, and thus to enable the box to be arranged in more than one position relatively to the laths or to the wall section within which the box is to be mounted.

Still another object of this invention is to provide my slot-spanning channel-shaped fastening elements with means adapted upon projection through the slots into engagement with the laths or other wall section to automatically engage the same, and preferably I provide the flange portions thereof with struck up resilient fastening projections adapted upon passage of the flanges through the slots to automatically engage and grip opposite surfaces of the lath or wall section engaged thereby, thus providing an initial automatic engagement which will retain the anchoring element in its anchoring position on the lath or wall section.

Still another object of this invention is to provide a centrally-located integral upwardly projecting flange on the box having a screw-threaded horizontally disposed hole and also to provide in a flange or tongue section of such wall-engaging fastening elements a screw-threaded hole adapted to be aligned with said hole in said integral flange, thus enabling the passage horizontally of a screw through the screw-threaded bore in such integral tongue on the box and through the screw-threaded bore in a portion of the upright flange of my said fastening element for the purpose of preventing a releasing movement of the fastening element and thus to produce a more positive locking thereof with the switch box and a more positive engagement of such fastening element to the lath.

With these and other objects in view, the invention comprises the combination of members and arrangement of parts so combined as to co-act and cooperate with each other in the performance of the functions and the accomplishment of the results herein contemplated, and comprises in one of its adaptations the species or preferred form illustrated in the accompanying drawings, in which:

Fig. 1 is a front elevation of a switch box installed in a wall;

Fig. 2 is a view in plan of the top or bottom of one of my switch boxes;

Fig. 3 is a fragmentary section on the line 3—3 of Fig. 1, looking in the direction of the arrows and showing my fastening element located in slots positioned inwardly of the outer edge of the top of the box;

Fig. 4 is a fragmentary section on the line 4—4 of Fig. 1, looking in the direction of the arrows, and showing a section of lath engaged by my fastening element;

Fig. 5 is a view in side elevation of a channel-shaped fastening element employed by me;

Fig. 6 is a top plan view of the element shown in Fig. 5;

Fig. 7 is an end view of the element shown in Figs. 5 and 6;

Fig. 8 is a fragmentary section similar to Fig. 4 showing a wall section of different material; and Fig. 9 is a fragmentary section similar to Fig. 4 showing a wall section of still another material.

In the drawings (Fig. 1) $10$—$10^a$—$10^b$ and $10^c$ indicate fragmentary portions of the laths in the wall of a building surrounding a hole or opening 11 formed in such wall laths to permit the insertion, extension therein and mounting of an electrical switch box 12 with the closed rear section $12^a$ of the box arranged parallel to the wall at the rear of the opening therein. The box itself is open at its front wall portion to permit access thereto. When the box is so inserted and mounted, the forward part of the top wall $12^b$ and a similar part of the bottom wall extend into positions closely adjacent to the edges of the hole or opening 11 in the laths. Thus, the top wall of the box extends beneath the longitudinal edge $10^a$ of one of the upper hole-surrounding laths and the bottom wall of the box extends above the upper longitudinal edge $10^c$ of the lower hole-surrounding lath $10^d$.

In accordance with the preferred form of my invention, the forward portions of both the top and bottom walls of the box which are substantially similar in shape are provided with a group of mounting slots 13, $13^a$, 14, $14^a$ and 17, $17^a$. These slots are formed in the front portions of each of the upper and lower walls of the boxes and a pair of such slots are adapted to cooperate with channel-shaped fastening elements 15 having insertion-tongues or flange members $15^a$—$15^b$ at one side and flange members 15c and 15d on the other side thereof and these tongues or flanges are connected together by a web portion 15e and are insertable through pairs or sets of such slots in said upper and lower walls of the box.

Said box-mounting element preferably comprises a channel-shaped member embodying said web portion 15e having the flange or tongue members 15a—15b—15c—15d projecting outwardly at right angles from the edges of said web. The flanges 15a—15b are positioned contiguous to the corners at one side of the web portion 15e and the flanges 15c and 15d are positioned adjacent to the corners at the opposite side, thus providing after passage through a pair of said slots a lath-receiving channel 15e therebetween directly above the box and the bottom of this channel comprises a rib section 12c of the top of the box between said slots which forms an integral anchor for the channel-shaped fastening element.

Cubical electrical switch boxes are conventionally provided on the outer edge of their upper surfaces with integral centrally-located and upwardly-extending screw-engaging arms or fingers 16 which are provided with horizontal screw-threaded bores 16a, and in accordance with the preferred form of my invention, I utilize these fingers 16 and the hole therein in combination with a centrally-located horizontally-disposed and screw-threaded hole in my channel-shaped fastening element as a locking means for positively preventing any releasing movement of my said fastening elements. Thus, each box-fastening element 15 is provided centrally between two of the engaging tongues (15a—15b) with a flange 15f having a horizontal hole 15g which is screw-threaded and adapted to align with the screw-threaded bore 16a in the integral finger 16 to enable insertion of a screw or bolt as hereinafter more particularly specified.

In operation or use, the cubical box is inserted within the aperture or hole 11 with a pair of the slots in alignment with the edges of a lath or other wall section; the channel-shaped fastening element 15 is then inserted through slots from within the box and the flanges 15a—15b—15c, 15d thereof are moved upwardly or downwardly (in accordance with the application of the fastening to the top or bottom) through pairs of slots 13, 13a, 14, 14a or 14—14a—17—17a. Said flanges engage with the opposite sides of the edge of the lath 10 or 10c in accordance with the direction of insertion. If inserted upwardly, the mounting element at the upper end of the switch box 12 engages the lower edge 10d of the lath 10, and the mounting element 15' which extends through the lower end wall of the box 12 similarly will be engaged with the sides of the lath adjacent to the upper edge 10c thereof.

It is often desirable to arrange the box in more than one position relatively to the laths or other wall section within which the box is to be mounted, and for this purpose the slots are arranged in groups in the tops and bottoms of the box, and members of pairs of such slots 17—17a are positioned at the extreme outer edge of each of the upper and lower end walls of the box. Consequently, I am enabled, instead of passing flanges of said fastening element through the four inner slots 13, 13a—14, 14a, the outer flanges of the element 15 may be passed through the slot sections 17—17a while the inner tongue members are passed through the slots 14—14a, thus causing the box to be positioned further inward within the wall or opening 11 and enabling the outer open face of the box to be aligned with the outer face of the laths.

In Figs. 3 and 4, I have shown the fastening element 15 disposed within the two pairs of slots 13, 13a—14, 14a and engaging the bottom edge of a lath in a wall. In Fig. 8, I have shown the fastening element 15 similarly positioned to engage a section of wall-board 18, while in Fig. 9 I have shown the fastening element 15 engaging a section of a modified form of wall, and it will be noted in this view that the fastening element 15 is passed through slots 14, 14a and 17, 17a in the upper wall 12a of the electrical switch box 12, and the anchoring rib 12d within the box is positioned close to the outer edge.

In all cases, the fastening element 15 is preferably provided with struck up resilient fastening projections 15h and the slots 13, 13a—14, 14a and 17, 17a are provided at their edges with semi-circular partial bores 13b—14b and 17b, respectively, in order to permit the ready passage through the slots of the resilient fastening projections 15b, and it will be understood that when the mounting elements 15 are moved into place the projections 15h will extend into the material, viz., into the lath, wall-board or other wall surface, and will produce an automatic initial engagement which will retain the element 15 in wall-engaging position and prevent any outward accidental releasing movement therefrom. Such member 15 may, however, be released from such initial engagement of the lath or other wall surface if sufficient force is applied to the element 15 per se from a position beneath the same within the box, provided, however, that my locking element has not been applied as hereinafter specified.

Obviously the member 15 may be engaged with the slots 13, 13b and 14, 14a or 14, 14a and 17, 17a, and in the preferred form shown in Fig. 2 the edge bore passages 14b extend on opposite sides of the edges of the slot so as to permit the slot 14 to be paired with the slots 13, 13a on one side or with the slots 17—17a on the opposite side.

While the fastening elements 15, when fully inserted, securely fasten a switch box immediately to the laths, it is desirable to positively lock said element 15 in its fastened position to the box and to the lath, and with this end in view a bolt or screw 20 is inserted through the bore 16a in the tongue 16 and thence through the bore 15g in the flange 15f. As more particularly shown in Fig. 3, the end of the bolt that passed through the hole in said fastening element may, if desired, be projected into the lath to produce an additional connection therewith, but in any event the bolt 20 locks the fastening element to the box and provides a safety locking bolt which prevents releasing movement of the members 15 in relation to the box and therefore locks such members 15 to the box and to the lath.

In Fig. 8 I have shown a fragmentary portion 18 of a conventional laminated plaster wall in which my box 12, a fragmentary portion of which is shown, is mounted. In said figure one of my two fastening elements 15 is shown engaging opposite sides of the wall 18.

In Fig. 9 I have shown a fragmentary portion of a box connected with a fragmentary portion of another form of conventional wall with one of my two fastening elements also engaging opposite sides of the wall.

Having described my invention, I claim:

1. A switch box mounting comprising in combination, a building wall having an aperture of rectilinear outline, a switch box of substantially similar size and contour adapted to be mounted in said wall aperture, said switch box having a pair of integral wall portions aligned with and abutting edge portions of said wall aperture and disposed opposite to each other, parallel guide slots spaced from each other in said box to correspond with the thickness of the adjacent wall, a channel-shaped fastening element comprising a web portion and having spaced side flanges insertable through a pair of said guide slots into engagement with opposite surfaces of said wall, and means on the facing surfaces of said spaced flanges operable automatically upon insertion of the flanges for engaging opposite wall surfaces and fixedly retaining such flanges in inserted position to anchor said fastening element to said integral wall portion of the box and to fixedly mount said switch box within said building-wall aperture.

2. A switch box mounting as claimed in claim 1 in which the guide slots for the fastening element at one side of the integral wall portion of the box comprise a pair of notches in the edge of the box section which guide the outer flanges of the channel-shaped fastening element along the extreme edge of the box, whereby the entire box will be positioned fully within the wall aperture and the open upper edges thereof will be positioned flush with the outer wall surface.

3. A switch box mounting as claimed in claim 1 in which the automatically-operable means which extend toward each other on the facing surfaces of said spaced flanges comprise resilient struck-up fastening projections adapted upon insertion of said flanges to engage and bite into opposite surfaces of a wall and to retain the flanges of said fastening element in inserted position and also to anchor said fastening element in inserted position and to mount said switch box within said building-wall aperture.

References Cited in the file of this patent

UNITED STATES PATENTS

| | | |
|---|---|---|
| 916,436 | Greenfield | Mar. 30, 1908 |
| 1,519,927 | Polhemus | Dec. 16, 1924 |
| 1,725,293 | Morgenstern | Aug. 20, 1929 |
| 1,821,083 | Visel | Sept. 1, 1931 |
| 1,935,601 | Winter | Nov. 14, 1933 |
| 2,039,550 | Norton | May 5, 1936 |
| 2,261,650 | Kost | Nov. 4, 1941 |
| 2,367,043 | Nelson | Jan. 9, 1945 |
| 2,692,697 | Hamilton et al. | Oct. 26, 1954 |